United States Patent [19]

Davis et al.

[11] Patent Number: 5,284,498
[45] Date of Patent: Feb. 8, 1994

[54] CYLINDRICAL FILTERS IN A TUBE SHEET FOR CLEANING HIGH TEMPERATURE GASES

[75] Inventors: Charles M. Davis; Reijo Kuivalainen; Karukkampalayam M. Sellakumar, all of San Diego, Calif.; Folke Engstrom, Kotka, Finland; Juhani Isaksson; Juha Tiensuu, both of Karhula, Finland

[73] Assignee: A. Ahlstrom Corporation, Karhula, Finland

[21] Appl. No.: 974,414

[22] Filed: Nov. 12, 1992

[51] Int. Cl.⁵ .............................................. B01D 29/13
[52] U.S. Cl. .................................... 55/269; 55/302; 55/341.4; 55/341.7; 55/523
[58] Field of Search .................. 55/269, 302, 341.1, 55/341.2, 341.4, 341.7, 344, 350, 374, 378, 418, 523

[56] References Cited

U.S. PATENT DOCUMENTS

| | | | |
|---|---|---|---|
| 1,875,341 | 9/1932 | Horne et al. | 55/269 |
| 2,792,074 | 5/1957 | Schilb et al. | 55/341.1 X |
| 4,343,631 | 8/1982 | Ciliberti | 55/302 |
| 4,539,025 | 9/1985 | Ciliberti et al. | 55/378 X |
| 4,764,190 | 8/1988 | Israelson et al. | 55/269 |
| 4,793,292 | 12/1988 | Engstrom et al. | 55/269 X |
| 4,867,769 | 9/1989 | Oda et al. | 55/302 |
| 4,869,207 | 9/1989 | Engstrom et al. | 122/4 D |
| 4,973,459 | 11/1990 | Lippert et al. | 55/302 X |
| 5,110,332 | 5/1992 | Isaksson | 55/378 |
| 5,114,581 | 5/1992 | Goldsmith et al. | 210/680 |
| 5,143,530 | 9/1992 | Haldipur et al. | 55/302 X |

FOREIGN PATENT DOCUMENTS

| | | | |
|---|---|---|---|
| 0234796 | 4/1986 | Fed. Rep. of Germany | 55/341.1 |
| 1083427 | 9/1967 | United Kingdom | 55/269 |

Primary Examiner—Robert Spitzer
Attorney, Agent, or Firm—Nixon & Vanderhye

[57] ABSTRACT

A filter assembly for high temperature gases, such as from a circulating fluidized bed reactor, mounts monolithic ceramic filter elements within an upright vessel so that as the hot gas flows from the top toward the bottom of the vessel the gas passes through the elements with the clean gas discharged through a side wall of the vessel. The particle discharge is provided at the bottom of the vessel. Filter supporting elements within the vessel are cooled by cooling fluid, and pulse cleaning elements are associated with each of the filter elements. Flow directing elements within the vessel typically define a generally conical or pyramidal shaped flow directing surface. The flow directing elements may be refractory material bodies, or funnel shaped thin elements (e.g. of metal capable of withstanding high temperature), and may be mounted so that small amounts of movement are possible to accommodate thermal contraction or expansion.

31 Claims, 8 Drawing Sheets

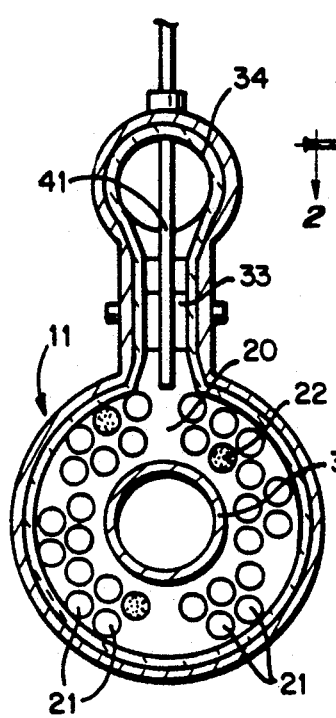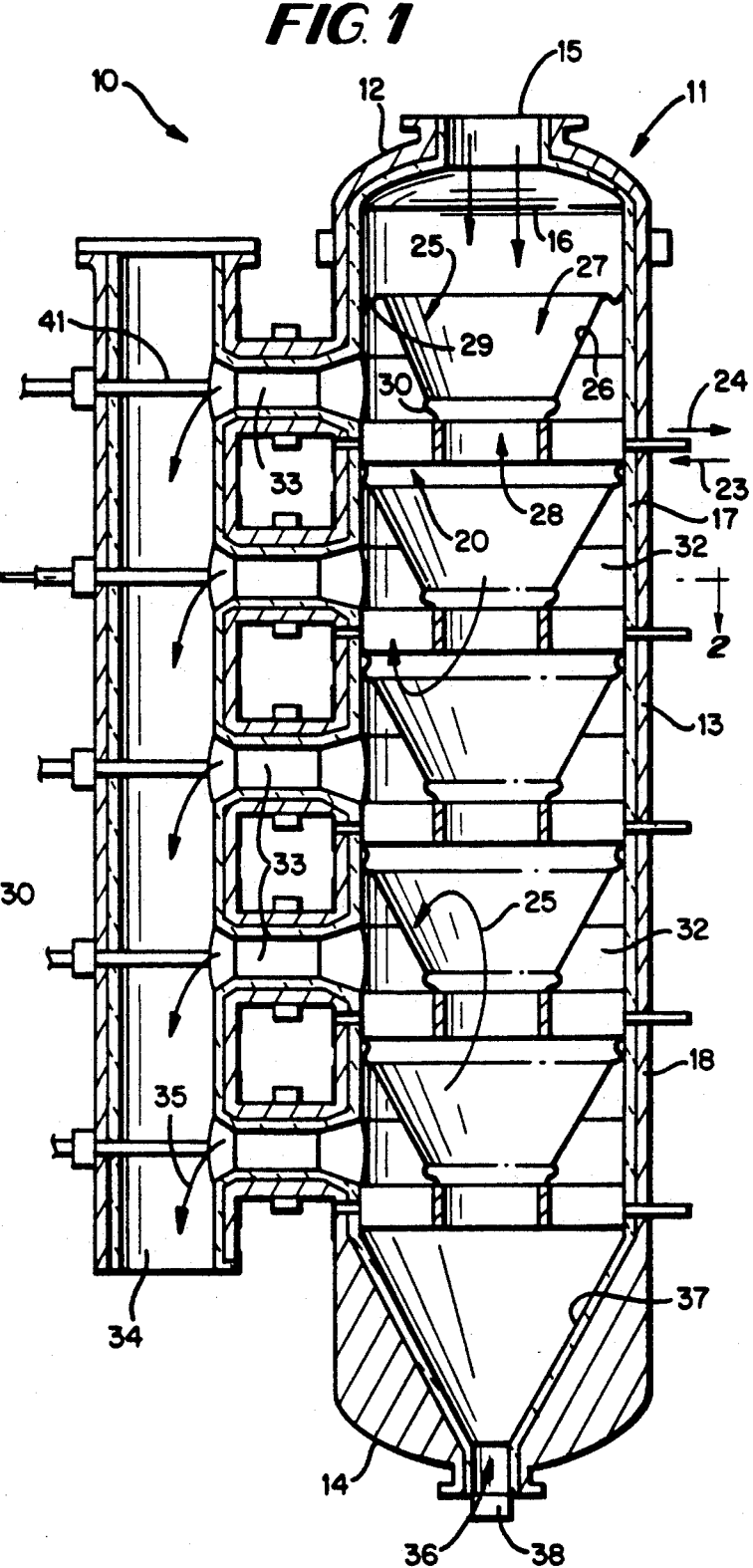

CYLINDRICAL FILTERS IN A TUBE SHEET FOR CLEANING HIGH TEMPERATURE GASES

BACKGROUND AND SUMMARY OF THE INVENTION

The invention relates to a filter assembly for high temperature gases, such as the high temperature, high pressure gases discharged from a circulating fluidized bed reactor. It is necessary to treat such gases to remove particles from the gases, and under some circumstances a filtration apparatus for that purpose is desirable. The filtration apparatus typically comprises, such as shown in U.S. Pat. No. 4,869,207 (the disclosure of which is hereby incorporated by reference herein) ceramic tubes. Other known structures include tubular fabric bag filter elements, such as shown in U.S. Pat. No. 4,764,190. While such systems can successfully remove particles from high temperature gas streams, there is a need for such a system that has flexibility in the types of filter elements that can be utilized, and one that is particularly amenable to having a high density of filter surface so that the system can have a minimum size for a given filtering capability.

According to the present invention, a filter assembly for high temperature gases, both from pressurized (i.e. superatmospheric pressure) systems and atmospheric systems, is provided which allows flexibility in the use of the exact filter media, and which can be provided with high density filter surfaces, so as to have a minimum size for a maximum volume. While the invention is useful with conventional candle type ceramic filters (as shown in U.S. Pat. No. 4,869,207), and also may utilize conventional Asahi filters, the invention is particularly useful with CeraMem ® filters such as shown in U.S. Pat. No. 5,114,581. The invention ensures proper filter operation by mounting the filter elements, typically monolithic ceramic cylinders, such as of CeraMem ® material, in apertured plates that are cooled, as by circulating cooling fluid (e.g. water) within them. Also the filters are periodically cleaned by pulsing backflushing gas therethrough, the backflushing of gas known per se for example from U.S. Pat. No. 4,764,190 and co-pending application Ser. No. 07/569,125 filed Aug. 17, 1990, now U.S. Pat. No. 5,242,472. Various hot gas flow directing elements are provided for positively directing the flow of gas, and the filters are arranged in such a manner as to provide optimum filtration for a given amount of volume.

According to one embodiment of the present invention a filter assembly for high temperature gases is provided. The assembly comprises the following elements: A generally upright vessel having a top, a bottom, and a side wall. A high temperature gas inlet adjacent the vessel top. A plurality of filter supporting elements extending generally horizontally within the vessel. A plurality of hollow flow directing elements each defining a generally conical or pyramidal shaped flow directing surface, disposed within the vessel and having a large upper opening, and a smaller bottom opening, each of the flow directing elements terminating in or adjacent a filter supporting element. A plurality of filter elements mounted by each of the filter supporting elements disposed exteriorly of the smaller bottom opening of an associated flow directing element, with the smaller bottom opening of an associated flow directing element extending through its associated filter supporting element. A cleaned gas outlet disposed in the vessel between at least some of the filter supporting elements. And, a particle discharge adjacent the bottom of the vessel.

A gas pulse cleaning means is preferably disposed within the volume between at least some of the filter supporting elements, exteriorly of the flow directing elements, to pulse clean the filter elements. Also there preferably is provided means for directing a cooling fluid into operative association with the filter supporting elements to effect positive cooling thereof. Expansion means may be provided for connecting each flow directing element adjacent a top portion thereof to at least one of the vessel side wall or the filter support element located above it, to allow relative movement between the components so connected. The vessel may be circular in cross-section with the filter support elements circular plate-like elements, and with the flow directing elements thin conical elements having a generally funnel shape.

The filter elements may each comprise a cylindrical monolithic porous material element containing a plurality of passageways extending generally vertically and having a plurality of plugs, and including a microporous membrane applied to the walls of the passageways; that is they may be CeraMem ® material as shown in U.S. Pat. No. 5,114,581 (the disclosure of which is hereby incorporated by reference herein).

The flow directing elements may comprise refractory material bodies having an interior surface formed as the flow directing surface, and the filter supporting elements may comprise rings of heat conductive material having an annular channel therein, the filter elements extending generally vertically and having one end in the annular channel. Alternatively the filter supporting elements may comprise generally planar elements. The openings in the filter support elements may have a progressively smaller cross-sectional area (e.g. diameter) from the gas inlet toward the particle discharge.

According to another aspect of the present invention, a support assembly for a plurality of cylindrical monolithic filter elements is provided. The support assembly comprises the following elements: A support structure having first and second major faces, and means defining a plurality of through extending openings extending from the first major face to the second major face. A plurality of generally cylindrical monolithic filter elements mounted in the through extending openings. And, means for cooling the support structure by circulating cooling liquid into association therewith.

The support structure may be a planar element, or be ring-shaped and have an annular channel formed therein. The radially spaced faces forming the annular channel may be the first and second major faces in which case the cylindrical filter elements will extend generally horizontally, or the major faces may be generally horizontal in which case the filter elements will extend generally vertically.

The invention also has as another embodiment a filter assembly for high temperature gases comprising the following elements: A generally upright vessel having a top, a bottom, and a side wall. A high temperature gas inlet adjacent the vessel top. A plurality of vertically spaced filter supporting elements within the vessel. A plurality of monolithic generally cylindrical ceramic filter elements mounted by each of the filter supporting elements. A plurality of flow directing elements defining flow directing surfaces, disposed within the vessel, for directing the flow of high temperature gases from the gas inlet ultimately toward the filter elements. A cleaned gas outlet disposed in operative association with the vessel between the filter supporting elements, extending through the side wall. And, a particle discharge adjacent the bottom of the vessel.

The flow directing elements may comprise the funnel-shaped elements described above, or vertically staggered non-symmetrical plates disposed on opposite sides of a generally vertical axis of the vessel, the filter supporting elements comprising vertically staggered non-symmetrical elements mounted below each of the flow directing elements. The filter elements may be mounted within a housing including a venturi expander cone disposed between each filter element and the gas outlet, particularly when the filter elements are generally horizontal. Gas pulse cleaning means may be associated with each of the filter elements for directing cleaning gas into the venturi expander cones. The plurality of filter supporting elements may be integral, defining a continuous inner shell substantially concentric with the vessel, or they may be entirely distinct, and each filter supporting element may mount a plurality of vertically spaced rows of filter elements.

It is the primary object of the present invention to provide a desirable filter assembly for treatment of high temperature gases, both pressurized and atmospheric pressure. This and other objects of the invention will become clear from an inspection of the detailed description of the invention, and from the appended claims.

BRIEF DESCRIPTION OF THE DRAWINGS

FIG. 1 is a side cross-sectional view of an exemplary filter assembly according to the present invention;

FIG. 2 is a cross-sectional view taken along lines 2—2 of FIG. 1;

DETAILED DESCRIPTION OF THE DRAWINGS

Figure 3:
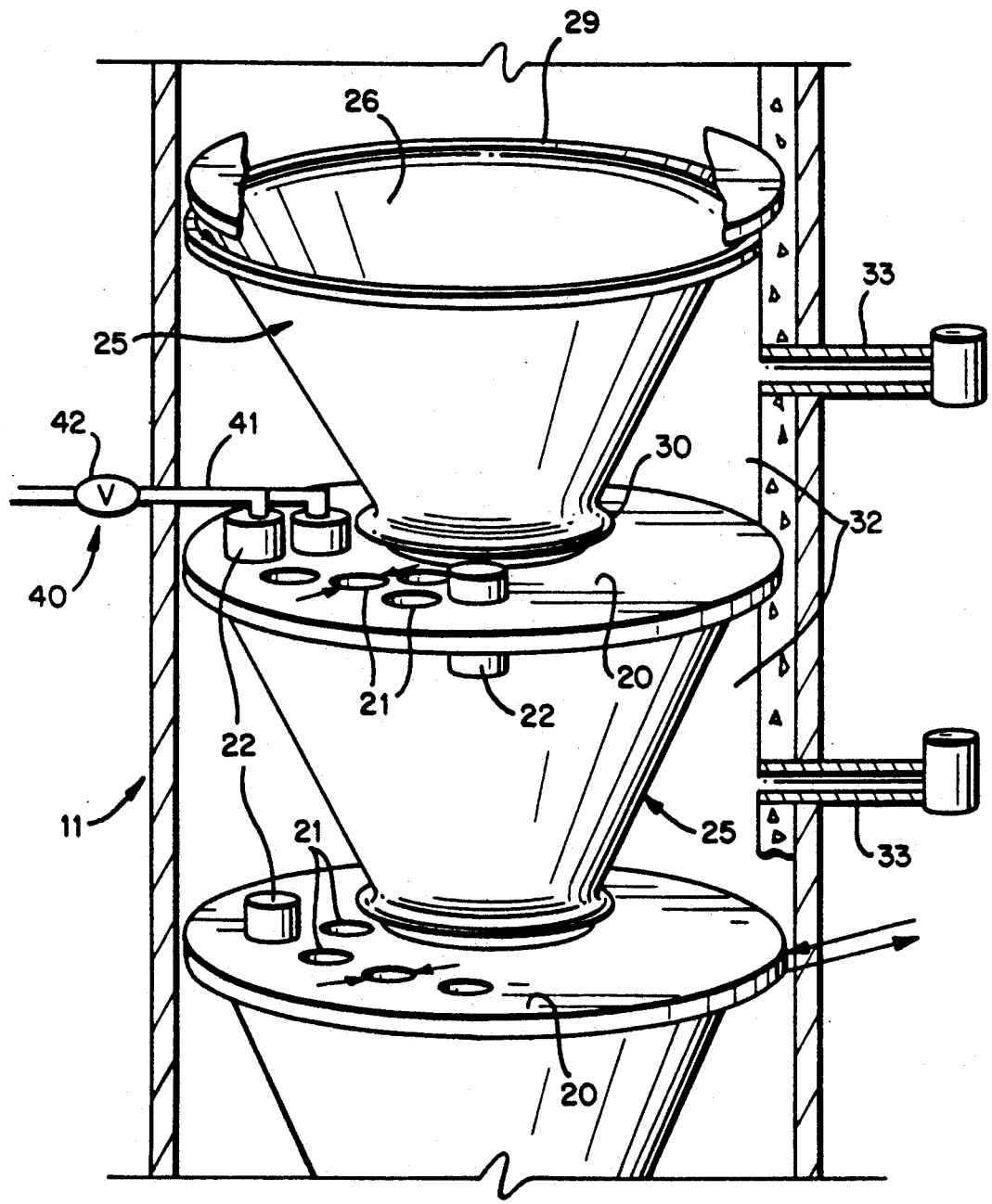
FIG. 3 is a schematic perspective view with the near side of the vessel cut away for clarity of illustration, illustrating a portion of the assembly of FIGS. 1 and 2.

An exemplary filter assembly for high temperature gases is shown generally by reference numeral 10 in FIG. 1. It includes a generally upright vessel 11 having a top 12, side wall 13, and bottom 14. In the top 12 is a high temperature gas inlet 15, which can be connected to a circulating fluidized bed reactor or the like, such as shown in U.S. Pat. No. 4,869,207. Particle laden ("dirty") high temperature gas—as shown by arrow 16 in FIG. 1—flows downwardly within vessel 11. In order to minimize heat transfer, insulation (e.g. refractory insulation) 17 may be provided between the vessel 11 metal shell 18 and the hollow interior of the vessel 11.

In the FIGS. 1–3 embodiment, a plurality of filter supporting elements are provided, shown generally by reference numeral 20, in this embodiment in the form of generally planar elements. Each of the elements 20 has a plurality of through-extending openings 21 (see FIGS. 2 and 3) therein which are adapted to receive generally cylindrical filter elements 22, only a few of which are seen in FIGS. 2 and 3, but one of which is provided in each of the openings 21. Since the openings 21 extend through the major faces of the planar filter supporting elements 20, the openings 21 and the filter elements 22 are generally vertical.

The filter elements 22 may comprise candle filters, Asahi filter elements, or the like, but preferably are CeraMem ® ceramic gas filter elements which are described in detail in U.S. Pat. No. 5,114,581. A generic description of such elements is a cylindrical "monolithic porous material element containing a plurality of parallel passageways and having a plurality of plugs, and including a microporous membrane applied to the walls of the passageways". Preferably the porous material and the microporous membrane are both of ceramic material. Such a filter element allows the maximum amount of high temperature gas filtering capability surface within a given volume. The cylindrical construction of the elements 22 preferably is circular in cross-section, the openings 21 being circular too and having only a slightly larger interior diameter than the exterior diameter of the filter elements 22 so that an interference type fit is provided. Alternatively various conventional hardware for holding a cylindrical element in a plate may be provided for mounting the filter elements 22.

Preferably, the filter support elements 20 are cooled so as to maintain a desired temperature of the ceramic filter elements 22 lower than the temperature of the gas being filtered. This cooling is typically provided by using interior liquid conducting passageways within the elements 20, and forming elements 20 of heat conductive material (e.g. steel), the cooling being shown schematically in FIG. 1 wherein for each filter supporting element 20 a liquid (e.g. water) inflow pipe 23 is provided and a liquid outflow pipe 24. The particulars of the filter supporting element 20 cooling mechanism is not critical, and conventional generally planar tubular element supporting structures may be utilized, such as shown in U.S. Pat. No. 5,110,332.

Also mounted within the vessel 11 are a plurality of hollow flow directing elements, shown generally by reference numerals 25. These elements 25 each define a generally conical or pyramidal shaped flow directing surface 26, and have a larger upper opening 27 and a smaller bottom opening 28 (that is tapering inwardly as one moves downwardly, in the direction of gas flow 16). The flow directing elements 25 terminate in or adjacent a filter supporting element 20.

In the particular embodiment illustrated in FIGS. 1–3, each of the flow directing elements 25 comprises a thin conical element having a funnel shape. Preferably expansion means are provided for mounting the elements 25, such as a bellows type convolution 29 at the top thereof and a like bellows type convolution 30 at the bottom thereof. The convolutions 29, 30 may be mounted at their top either to a side wall 13 of the vessel 11, or to the bottom of an upper filter supporting element 20, while the bottom expansion means 30 is preferably mounted to the filter supporting element 20 below it. Preferably the flow directing elements 25 are not cooled since that might provide an excessive amount of cooling surface that could result in cooling the gas too much and therefore an efficiency loss to the cycle. Therefore the flow directing elements 25 must be of a material capable of withstanding the high temperature that they will be exposed to, yet allow for some expansion at the fluid tight expansion elements 29, 30 at the top and bottom thereof. One exemplary suitable material for this purpose is a high temperature metal "Haynes alloy No. 556", an iron-nickel-chromium-cobalt alloy available from Haynes International, Inc. of Kokomo, Ind.

The assembly 10 further comprises a cleaned gas outlet associated with each of the filter elements 20. For example various open chambers 32 are provided between each pair of filter supporting elements 20, exteriorly of the flow directing elements 25, the chambers 32 cooperating with insulated passageways 33 which conduct the clean gas to an outer insulated gas conduit 34, the gas flowing as indicated by arrows 35 and being led to a utilization or further treatment device, such as a turbine, heat exchanger, etc. As seen in the FIGS. 1 and 2 embodiment, the conduit 34 is generally parallel to and spaced from the vessel 11.

The assembly 10 further comprises a particle discharge, shown generally by reference numeral 36, at the bottom thereof. The particle discharge includes the funnel-shaped interior side wall 37 of the vessel 11 at that point, and a discharge conduit 38. The hot particles flowing out of conduit 38 may be recirculated to the fluidized bed reactor, or otherwise acted upon in a conventional manner.

As seen in all of FIGS. 1 through 3, a pulse backflush gas cleaning means, shown generally by reference numeral 40, also may be provided associated with the filter elements 22. For example a conduit 41, with a control valve 42 (see FIG. 3) therein passes into each of the chambers 32 in operative association with the elements 22, to direct a cleaning backflushing gas into association with each of the elements 22, so as to dislodge any filter cake, and cause it to fall downwardly to be directed by the next lower flow directing element 25 ultimately to the particle discharge 36. As seen in FIG. 3 it is preferred that the backflush gas introducing elements 41 be disposed immediately above each of the elements 22, rather than introducing backflushing gas into the chamber 32 in general, in order to most effectively dislodge the caked on filter material, which may be especially difficult with CeraMem ® filter media.

Figure 4:
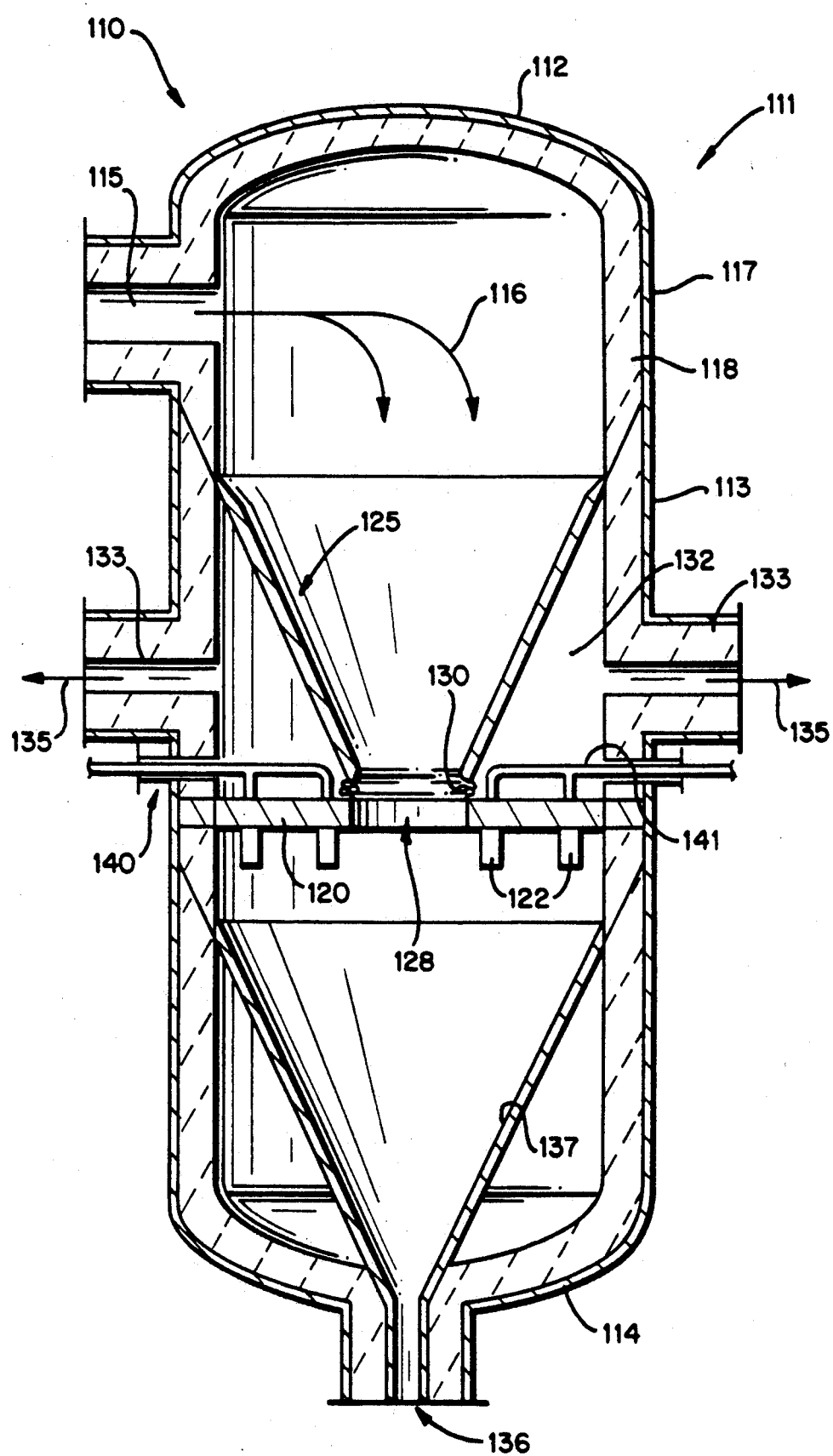
FIG. 4 is a view like that of FIG. 1 of another embodiment according to the invention.

While FIGS. 1 through 3 show a multi-stage arrangement, it is to be understood that a single stage arrangement could be provided, as illustrated in FIG. 4. In FIG. 4 components comparable to those in the FIGS. 1 through 3 embodiment are shown by the same reference numeral only preceded by a "1". In this embodiment, the gas inlet, though at the top of the vessel 111, is not at the very top, but at the top of the side wall 113. The hot particle laden gas flows downwardly past the inside refractory 118 toward the metal vessel shell 117, directed by the flow directing element 125 to flow through the small bottom opening 128 therein. Then the gas flows upwardly through the ceramic filter elements 122 into the chamber 132, and flows out one of the multiple outlets 133 disposed around the circumference of the vessel 111. The filter supporting elements 120 are cooled (not shown), and backflushing purge gas is introduced in line 141 of purge gas means 140. Hot particles are removed from the particle discharge 136 at the bottom 114 of the vessel 111.

Figure 5:
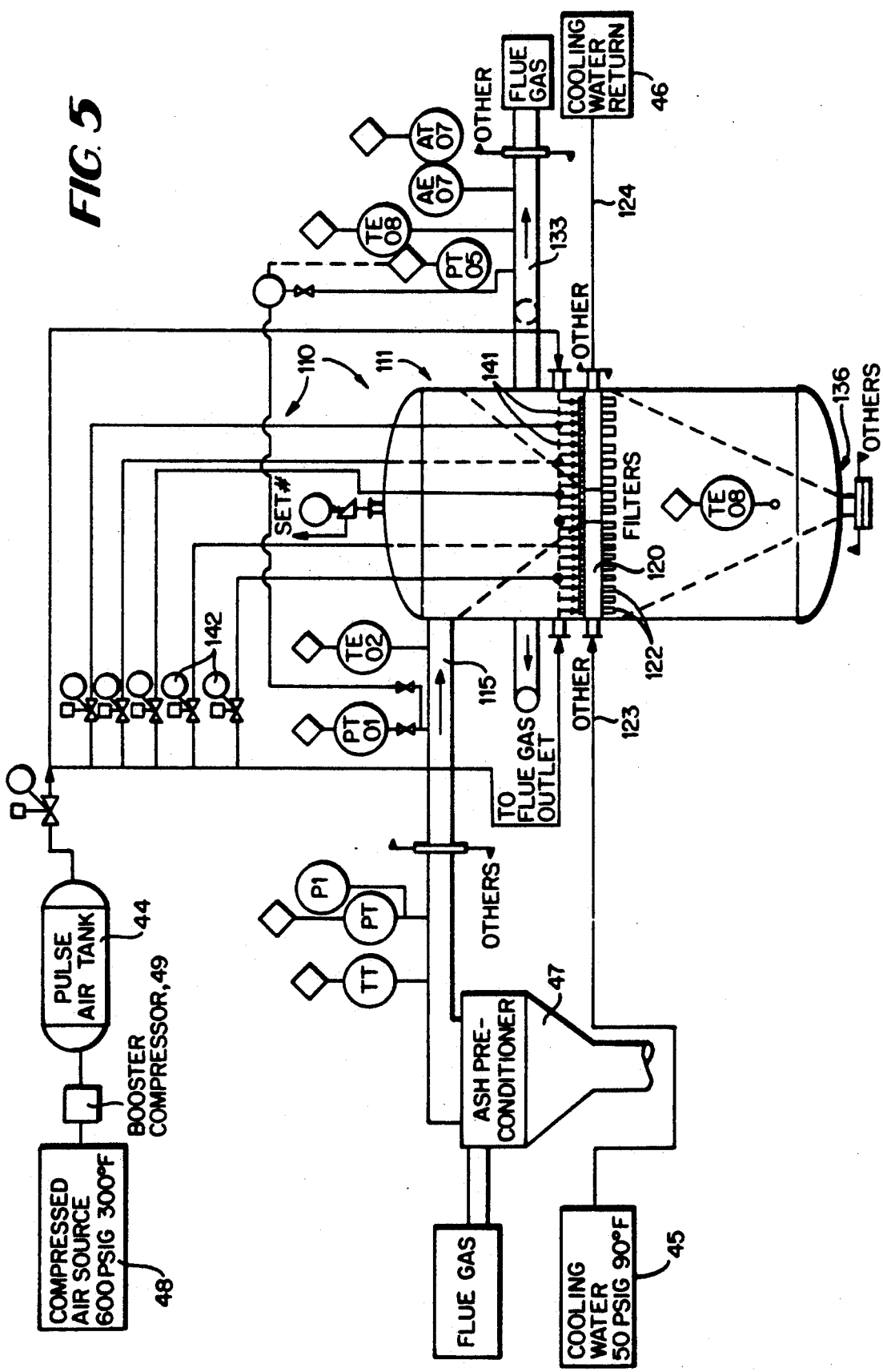
FIG. 5 is a schematic view of an exemplary pulse cleaning system and support plate cooling system utilizable according to the present invention.

FIG. 5 schematically illustrates a system concept for the cooling water and backflush gas that is utilized with an assembly such as the assembly 110. A pulse air tank 44 is provided, and each of the lines 141 (which may have multiple end conduits which are disposed over a number of different filter elements 122) are connected up to valves 142, which are controlled by a controller, which sequences which of the filter elements 122 is being cleaned while the others are in operation. Note in this figure the source 45 for cooling water, which may, for example, be at 50 psig and a temperature of about 90° F., as well as the cooling water return dump 46 associated with line 124. The filter supporting element 120 is cooled by the cooling water from source 45. The clean gas in line 133 may pass to a turbine, or otherwise be utilized or disposed of, or passed on to another unit 110 for further filtration. If desired an ash preconditioner 47 (see FIG. 5) can be provided to remove large ash particles from the gas before it is introduced in inlet 115 into vessel 111.

The pulse air tank 44 may be provided with compressed air as the gas, e.g. compressed air from source 48 at 600 psig and a temperature of about 300° F., which may be further compressed by a booster compresser 49. The pulse control mechanism such as shown in co-pending application Ser. No. 07/569,125 filed Aug. 17, 1990, now U.S. Pat. No. 5,242,472, may also be utilized.

Figure 6:
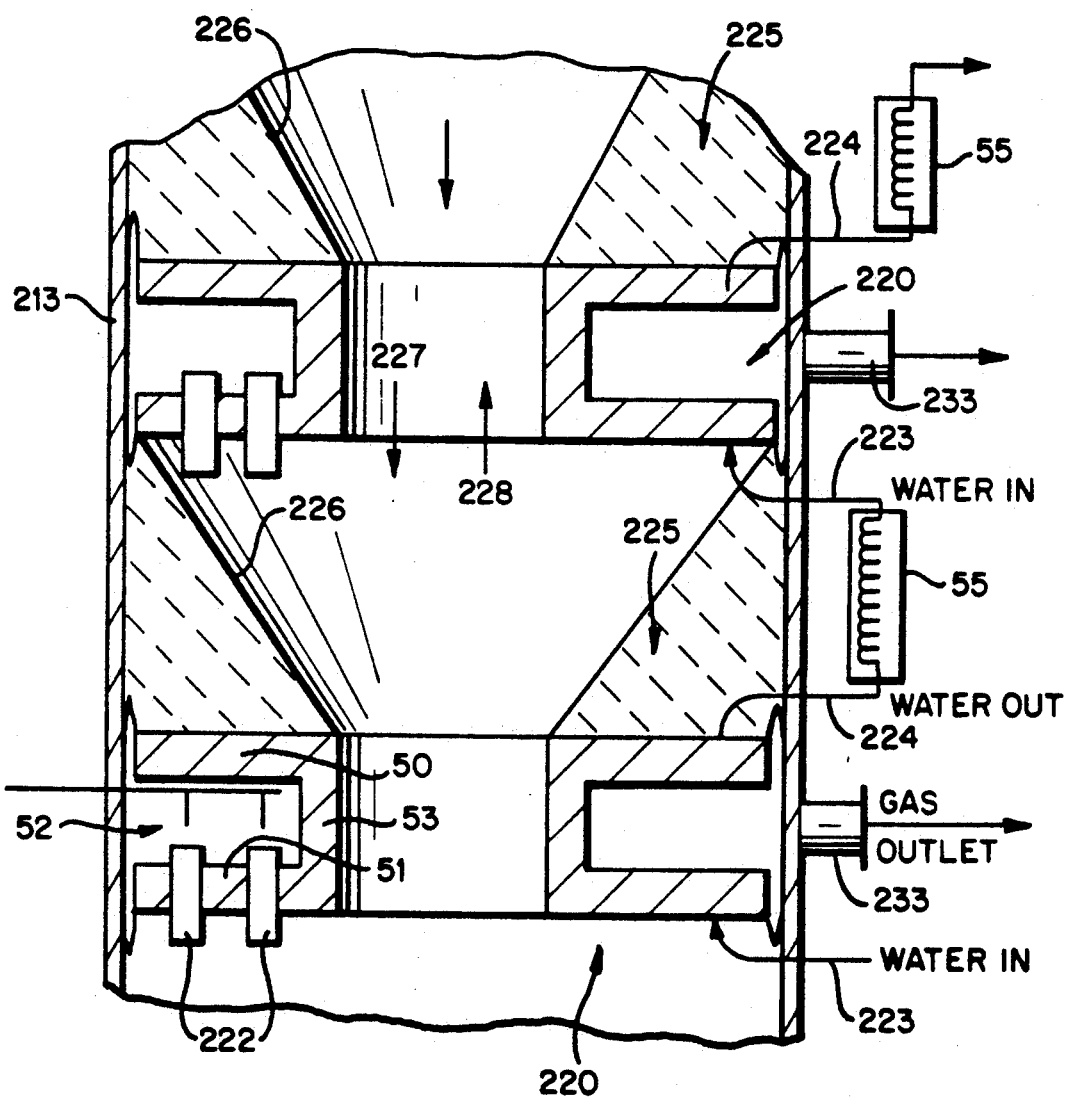
FIG. 6 is a detail side schematic view primarily in cross-section illustrating another embodiment of filtering assembly according to the invention.

FIG. 6 shows another structure like that of components FIGS. 1 through 5 only, with somewhat different components. In this embodiment components comparable to those in the FIGS. 1 through 5 embodiments preceded by a "2".

In FIG. 6, the flow directing elements 225 are preferably in the form of ceramic or like refractory solid bodies defining the conical or pyramidal internal flow directing surfaces 226 having a large top 227 and a small bottom 228. The filter supporting elements 220 are in the form of ring-shaped elements, having a top generally planar surface 50 and a bottom generally planar surface 51 separated by an annular channel 52, with there being an interior axial wall 53 defining in part the bottom opening 228 and the immediately above flow directing body 225. The ceramic filter elements 222 extend through openings (not numbered) in the lower generally planar portion 51, while the gas outlets 233 are connected to the interior of the channel 52.

The elements 220 are cooled by circulating water in conduits 223 and 224. Note that the water may move from one filter supporting element 220 to another, and a heat exchanger 55 for cooling the water may be provided between each of the elements 220.

Figure 7:
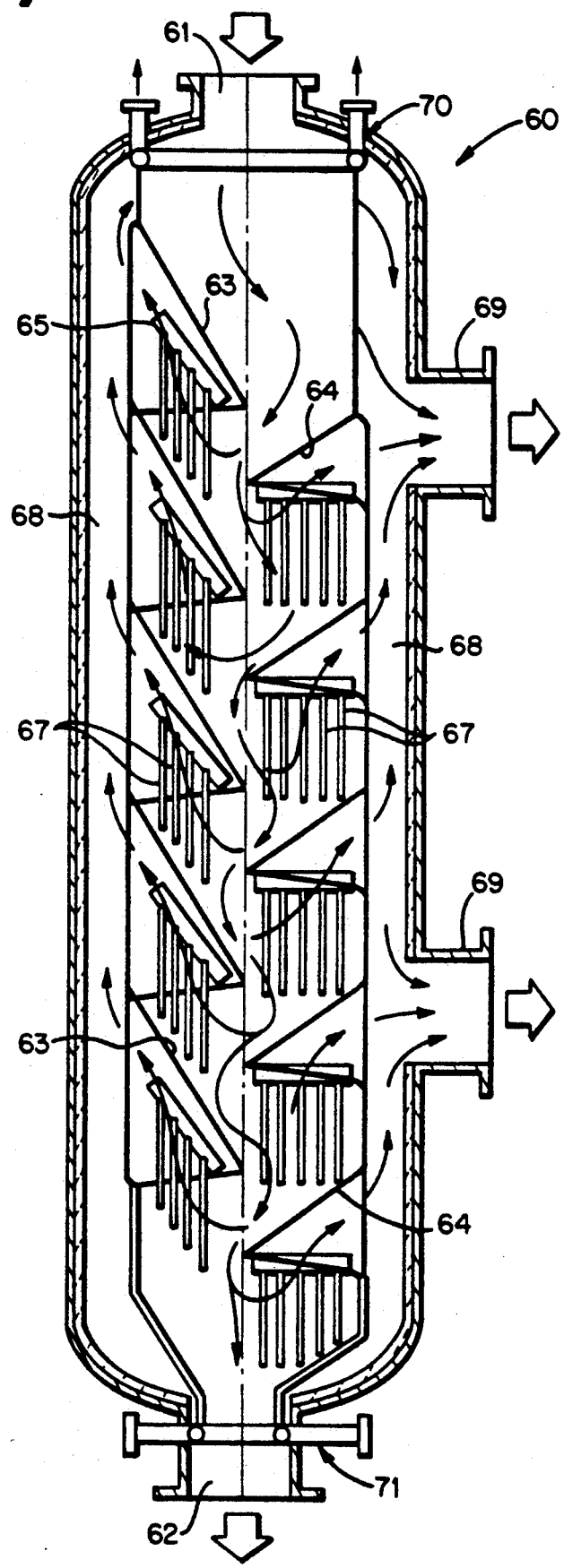
FIG. 7 is a view like that of FIG. 1 only showing another embodiment of filter assembly.

FIG. 7 illustrates another embodiment comprising a vessel 60 with a hot gas inlet 61 at the top and a particle discharge 62 at the bottom. In this embodiment, flow directing elements 63, 64 are vertically staggered and non-symmetrical, and the filter elements supporting structures 65, 66 associated with the flow directing elements 63, 64 are mounted below them, in this case mounting cassettes of candle type filter elements 67. Clean gas, which passes through the filter elements 67 into the annular volume 68, exits through cleaned gas discharge conduit 69. Both the top and bottom of the vessel 60 may be cooled, as indicated by cooling fluid circulation line/header 70 at the top adjacent the high temperature gas inlet 61 of the vessel 60, and the cooling fluid conduit/header 71 adjacent the particle discharge 62 at the bottom of the vessel 60.

Figure 8:
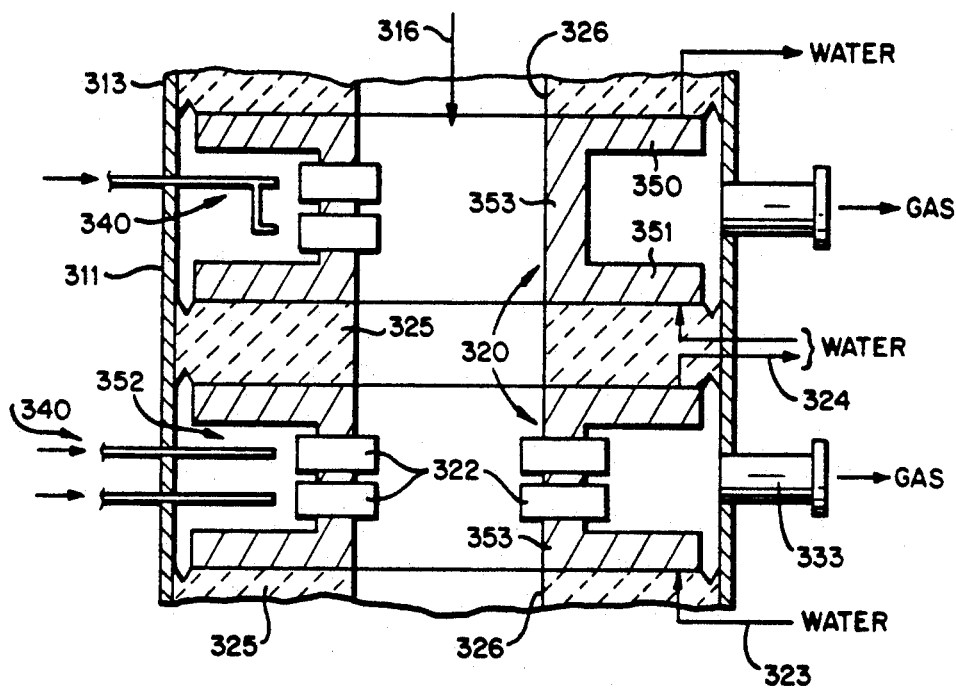
FIG. 8 is a view like that of FIG. 6 only of another embodiment of filter apparatus.

The FIG. 8 embodiment is similar to the FIG. 6 embodiment, except that it has a horizontal orientation of the filter elements, and corresponding modifications to accommodate that orientation. In this embodiment components comparable to those in the FIG. 6 embodiment are shown by the same two digit reference numerals only preceded by a "3".

In FIG. 8, dirty hot gas flows downwardly, as indicated at 316, in vessel 311 having sidewall 313, past and through cylindrical ceramic filter elements 322 mounted by filter supporting rings 320, typically of metal or other good heat conducting material. The openings (not numbered) in elements 320 extend radially and horizontally and receive the filter cylinders 322 therein. Each ring 320 comprises a top generally planar surface 350, bottom generally planar surface 351, interior axial wall 353 (in which the openings for filter elements 322 are formed), and an annular channel 352 separating surfaces 350, 351. The flow directing bodies 325 are preferably of lightweight refractory material, and the flow directing interior surfaces 326 formed thereby are generally vertical, rather than tapered in the earlier described embodiments. Pulse cleaning is provided by elements 340, cleaned gas is exhausted from annular channel 352 by exhaust conduit 333, and the rings 320 are cooled using water inlets 323 and outlets 324.

Figure 9:
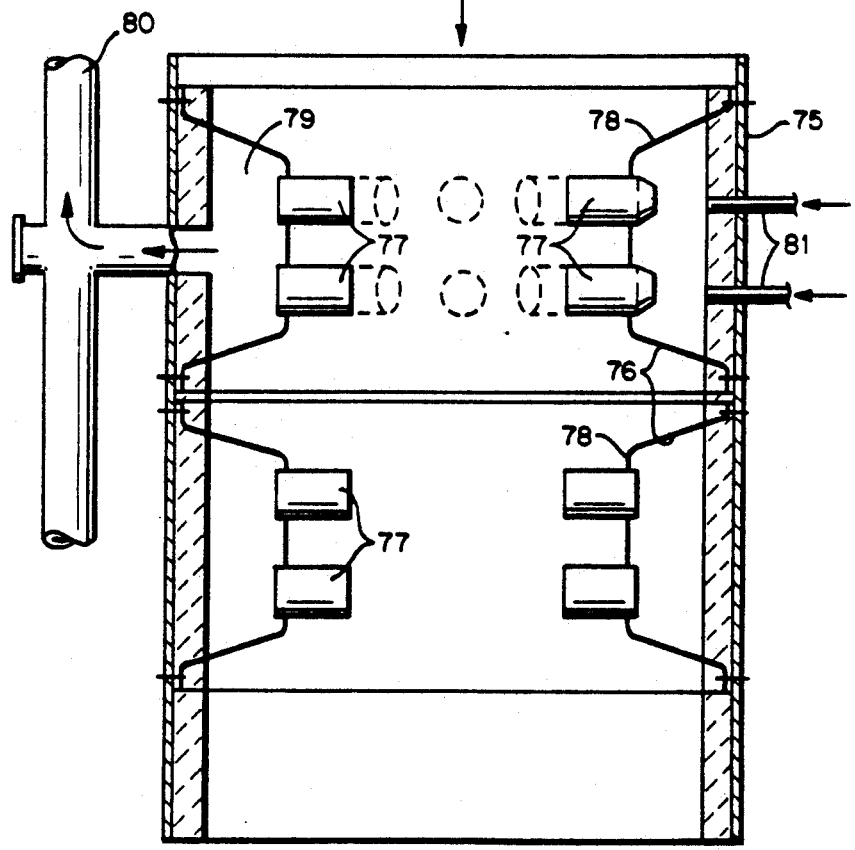
FIG. 9 is a detail side cross-sectional view of a part of yet another embodiment of gas filtering apparatus according to the invention.

In the embodiment of FIG. 9, only a portion of the vessel 75 is shown, but it has a gas inlet at the top and a particle discharge at the bottom just like the other embodiments. In the embodiment of FIG. 9, the supporting elements 76 for the filter element 77 also provide the flow directing surfaces 78, and mount the elements 77 in a plurality of rows within each element 76. Clean gas which passes into the chamber 79 may be withdrawn through clean gas headers indicated at 80, and pulse cleaning may be provided through line 81, one of which can be associated with each filter element 77 if desired.

Figure 11:
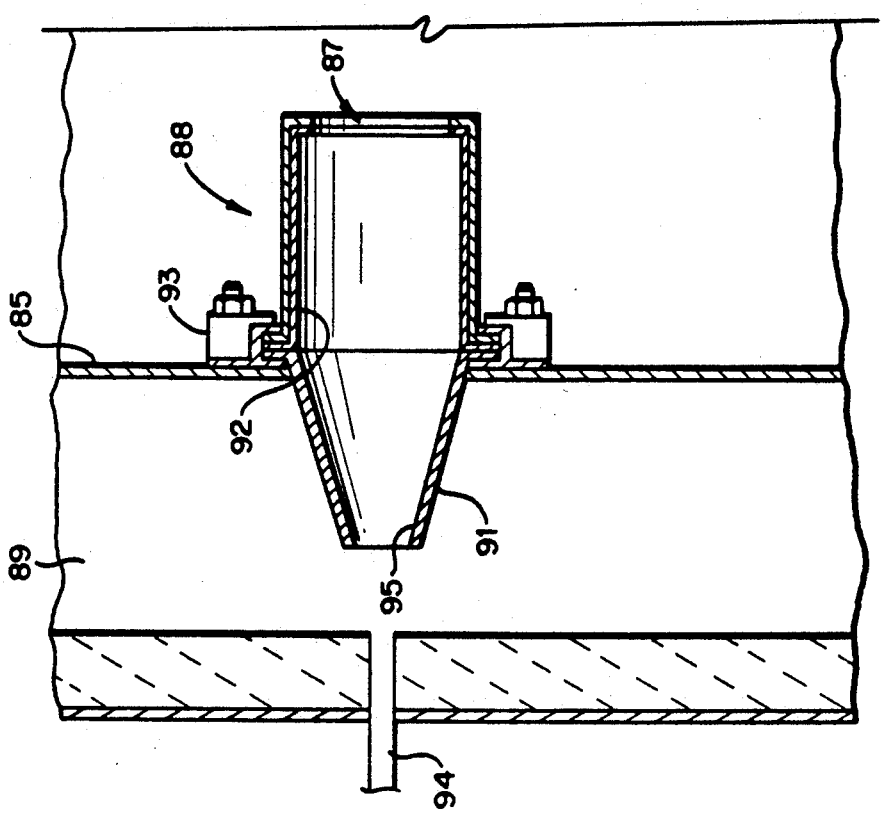
FIG. 11 is a detail side cross-sectional view showing the assembly of FIG. 10 particularly at one of the filter elements.
Figure 10:
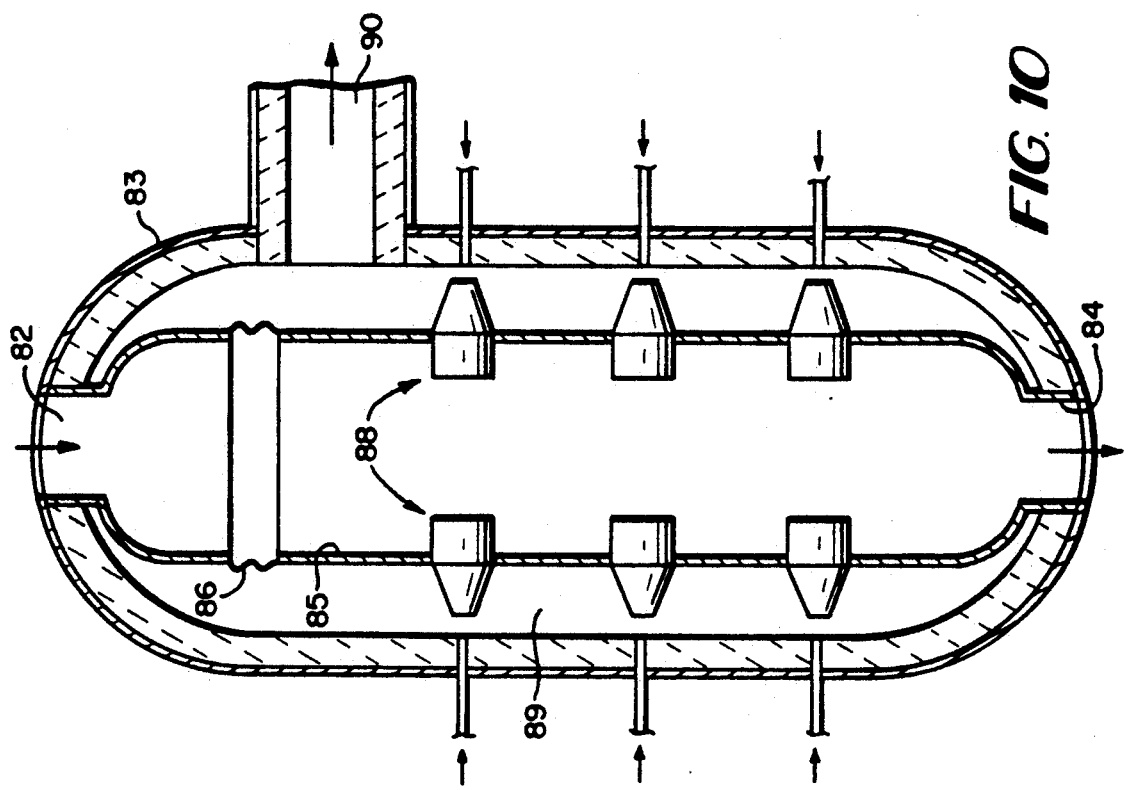
FIG. 10 is a view like that of FIG. 1 only showing another exemplary embodiment.

The embodiment of FIGS. 10 and 11 is similar to that of FIG. 9 in that the filter elements extend generally horizontally. In this embodiment, dirty hot gas flows into the inlet 82 for the vessel 83 at the top thereof, while particles are discharged from the particle discharge 84 at the bottom. The filter supporting elements comprise a single integral inner shell 85 substantially concentric with the vessel 83, and preferably an expansion joint 86 may be provided. The filter elements 87—see FIG. 11—preferably comprise tubular ceramic monolithic filter elements, as described above, mounted in outer housings 88, and extending generally horizontally so that dirty gas from the inside of the inner vessel 85 passes to the annular outer chamber 89 and then is discharged as clean gas through conduit 90 in the side wall of the vessel 83.

As seen in FIG. 11 the housing 88 includes a venturi expander cone portion 91 thereof extending from the filter element 87 into the chamber 89. High temperature gasket 92 may mount the filter element 87 within the housing 88, and a lock ring 93 may be provided to mount the housing 88 to the inner vessel wall 85. A pulsing/cleaning line 94 may be provided associated with each of the venturi expander cones 91 for directing backflush cleaning air into the open small end 95 of the expander cone 90, to thereby clean the monolithic filter element 87.

While several exemplary embodiments of the invention are shown, it is to be understood that other modifications are also possible within the scope of the invention. For example, internal baffling may be provided to restrict reentrainment of dust that is pulsed out of a filter element into the gas stream entering a downstream filter element. Also, as can be seen with respect to FIG. 3, the openings 21 in the filter supporting elements 20 may decrease in diameter (cross-sectional area) as one moves from the top 12 toward the bottom 14 of the vessel 11. This may be utilized since as gas is stripped out of the gas stream and cleaned at various elevations, the remaining dirty gas weight becomes less and therefore the holes can be progressively smaller in diameter to maintain the same gas velocity. The pore size of the filter elements 22 does not change, however. Also any desired mechanisms may be utilized to provide the flow so that it takes the path through a particular flow directing element 25, and then upwardly through the filter elements 22 into the clean gas discharge passages 33, such as by providing a suction force on the conduit 34 and/or having the gas flowing in flow 16 under substantial superatmospheric pressure. Internal refractory may also be used to reduce heat flow to uncooled components so that they will not overheat, or on cooled components so as to present a hot surface to gases so that condensation does not occur. These and numerous other embodiments are within the scope of the present invention which is to be accorded the broadest interpretation of the appended claims so as to encompass all equivalent structures and devices.

What is claimed is:

1. A filter assembly for high temperature gases, comprising:
    a generally upright vessel having a top, a bottom, and a side wall;
    a high temperature gas inlet adjacent the vessel top;
    a plurality of filter supporting elements extending generally horizontally within said vessel;
    a plurality of hollow flow directing elements each defining a generally conical or pyramidal shaped flow directing surface, disposed within said vessel and having a large upper opening, and a smaller bottom opening, each of said flow directing elements terminating in or adjacent a filter supporting element;
    a plurality of filter elements mounted by each of said filter supporting elements disposed exteriorly of said smaller bottom opening of an associated flow directing element, with said smaller bottom opening of an associated flow directing element extending through its associated filter supporting element;
    a cleaned gas outlet disposed in said vessel between at least some of said filter supporting elements; and
    a particle discharge adjacent the bottom of said vessel.

2. An assembly as recited in claim 1 further comprising gas pulse cleaning means disposed within the volume between at least some of said filter supporting elements, exteriorly of said flow directing elements, to pulse clean said filter elements.

3. An assembly as recited in claim 1 further comprising means for directing a cooling fluid into operative association with said filter supporting elements to effect positive cooling thereof.

4. An assembly as recited in claim 1 further comprising expansion means for connecting each flow directing element adjacent a top portion thereof to at least one of said vessel side wall and a filter support element located above it, to provide a substantially gas-tight seal therebetween but to allow limited relative movement of said flow directing element with respect to said flow supporting element and/or said vessel side wall.

5. An assembly as recited in claim 1 further comprising thermal insulation means provided between each filter supporting element and its associated flow directing element bottom to minimize thermal transfer therebetween.

6. An assembly as recited in claim 1 wherein said vessel is circular in cross section, and said filter support elements are circular plate like elements, and wherein said flow directing elements are thin conical elements having a generally funnel shape.

7. An assembly as recited in claim 1 wherein said filter elements each comprise a cylindrical monolithic porous material element containing a plurality of passageways extending generally vertically and having a plurality of plugs, and including a microporous membrane applied to the walls of said passageways.

8. An assembly as recited in claim 1 wherein said flow directing elements comprise refractory material bodies having an interior surface formed as said flow directing surface.

9. An assembly as recited in claim 8 wherein said filter supporting elements comprise rings of heat conductive material having an annular channel therein, and wherein said filter elements extend generally vertically and have one end thereof in said annular channel.

10. An assembly as recited in claim 1 wherein said filter supporting elements comprise generally planar elements.

11. An assembly as recited in claim 1 wherein said openings in said filter support elements have a progressively smaller cross-sectional area from said gas inlet toward said particle discharge.

12. A support assembly for a plurality of generally cylindrical monolithic filter elements comprising:
a support structure comprising a substantially solid body of heat conductive material having first and second major faces, and means defining a plurality of through extending openings extending from said first major face to said second major face;
a plurality of generally cylindrical monolithic filter elements mounted in said through extending openings, extending at least from said first major face to and past said second major face; and
means for cooling said support structure by circulating cooling fluid into association therewith, comprising a plurality of liquid conducting channels formed in said substantially solid body of heat conductive material, and means for circulating a cooling liquid through said liquid conducting channels.

13. An assembly as recited in claim 12 wherein said filter elements each comprise a cylindrical monolithic porous material element containing a plurality of parallel passageways and having a plurality of plugs, and including a microporous membrane applied to the walls of said passageways.

14. An assembly as recited in claim 13 wherein said porous material and said microporous membrane are both of ceramic material.

15. An assembly as recited in claim 12 wherein said support structure is a generally planar element.

16. An assembly as recited in claim 12 wherein said support structure is ring shaped, and has an annular channel formed therein, said second major face bordering said annular channel.

17. An assembly as recited in claim 12 wherein said support structure is ring shaped, and has an annular channel formed therein, said first and second major faces being radially spaced from each other and said second major face bordering said annular channel.

18. A support assembly as recited in claim 12 wherein said generally cylindrical monolithic filter elements extend outwardly from both of said major faces of said body.

19. A filter assembly for high temperature gases, comprising:
a generally upright vessel having a top, a bottom, and a side wall;
a high temperature gas inlet adjacent the vessel top;
a plurality of vertically spaced filter supporting elements within said vessel;
a plurality of monolithic generally cylindrical ceramic filter elements mounted by each of said filter supporting elements;
a plurality of flow directing elements defining flow directing surfaces, disposed within said vessel, for directing the flow of high temperature gases from said gas inlet ultimately toward said filter elements;
a cleaned gas outlet disposed in operative association with said vessel between said filter supporting elements, extending through said side wall; and
a particle discharge adjacent the bottom of said vessel.

20. An assembly as recited in claim 19 wherein said monolithic generally cylindrical ceramic filter elements are mounted by through extending openings in said filter supporting elements so that they extend generally horizontally.

21. An assembly as recited in claim 20 wherein each of said filter elements is mounted within a housing including a venturi expander cone disposed between each said filter element and said gas outlet.

22. An assembly as recited in claim 21 further comprising gas pulse cleaning means associated with each of said filter elements for directing cleaning gas into said venturi expander cone associated therewith.

23. An assembly as recited in claim 20 wherein each of said filter supporting elements mounts a plurality of vertically spaced rows of filter elements.

24. An assembly as recited in claim 19 wherein said monolithic generally cylindrical ceramic filter elements are mounted by through extending openings in said filter supporting elements so that they extend generally vertically.

25. An assembly as recited in claim 24 wherein said openings are circular and said filter elements have a circular cross-section, and wherein the diameter of said openings and filter elements decreases from said gas inlet toward said particle discharge.

26. An assembly as recited in claim 19 further comprising gas pulse cleaning means disposed within the volume between at least some of said filter supporting elements to pulse clean said filter elements.

27. An assembly as recited in claim 26 further comprising means for directing a cooling fluid into operative association with said filter supporting elements to effect positive cooling thereof.

28. An assembly as recited in claim 19 further comprising means for directing a cooling fluid into operative association with said filter supporting elements to effect positive cooling thereof.

29. An assembly as recited in claim 19 wherein said flow directing elements comprise vertically staggered non-symmetrical plates disposed on opposite sides of a generally vertical axis of said vessel, and wherein said filter supporting elements comprise vertically staggered non-symmetrical elements mounted below each of said flow directing elements.

30. An assembly as recited in claim 19 wherein said plurality of filter supporting elements are integral, defining a continuous inner shell substantially concentric with said vessel.

31. An assembly as recited in claim 30 further comprising expansion joint means connecting said inner shell to said vessel.

* * * * *